(12) United States Patent
Kesiraju et al.

(10) Patent No.: US 11,755,328 B2
(45) Date of Patent: Sep. 12, 2023

(54) COPROCESSOR OPERATION BUNDLING

(71) Applicant: Apple Inc., Cupertino, CA (US)

(72) Inventors: Aditya Kesiraju, Los Gatos, CA (US); Brett S. Feero, Austin, TX (US); Nikhil Gupta, Santa Clara, CA (US); Viney Gautam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/527,872

(22) Filed: Nov. 16, 2021

(65) Prior Publication Data
US 2022/0137975 A1 May 5, 2022

Related U.S. Application Data

(63) Continuation of application No. 16/242,151, filed on Jan. 8, 2019, now Pat. No. 11,210,100.

(51) Int. Cl.
G06F 9/38 (2018.01)
G06F 9/30 (2018.01)
(Continued)

(52) U.S. Cl.
CPC ........ *G06F 9/3814* (2013.01); *G06F 9/30018* (2013.01); *G06F 9/30043* (2013.01);
(Continued)

(58) Field of Classification Search
None
See application file for complete search history.

(56) References Cited

U.S. PATENT DOCUMENTS 5,630,075 A 5/1997 Joshi
10,037,211 B2 * 7/2018 Fernsler ............... G06F 9/3891
(Continued)

FOREIGN PATENT DOCUMENTS

JP 2008-535074 A 8/2008
KR 10-2016-0074622 A 6/2016
(Continued)

OTHER PUBLICATIONS

ISRWO, PCT/US2020/012232, dated Apr. 20, 2020, 16 pages.
(Continued)

*Primary Examiner* — Michael Sun
(74) *Attorney, Agent, or Firm* — Kowert, Hood, Munyon, Rankin & Goetzel, P.C.; Erik A. Heter; Dean M. Munyon

(57) ABSTRACT

In an embodiment, a processor includes a buffer in an interface unit. The buffer may be used to accumulate coprocessor instructions to be transmitted to a coprocessor. In an embodiment, the processor issues the coprocessor instructions to the buffer when ready to be issued to the coprocessor. The interface unit may accumulate the coprocessor instructions in the buffer, generating a bundle of instructions. The bundle may be closed based on various predetermined conditions and then the bundle may be transmitted to the coprocessor. If a sequence of coprocessor instructions appears consecutively in a program, the rate at which the instructions are provided to the coprocessor (on average) at least matches the rate at which the coprocessor consumes the instructions, in an embodiment.

20 Claims, 9 Drawing Sheets

(51) Int. Cl.
*G06F 9/48* (2006.01)
*G06F 9/52* (2006.01)

(52) U.S. Cl.
CPC .......... *G06F 9/3816* (2013.01); *G06F 9/3877* (2013.01); *G06F 9/4881* (2013.01); *G06F 9/522* (2013.01)

(56) References Cited

U.S. PATENT DOCUMENTS

| | | | |
|---|---|---|---|
| 10,095,543 | B1 | 10/2018 | Griffin et al. |
| 11,210,100 | B2 | 12/2021 | Kesiraju et al. |
| 2002/0184460 | A1* | 12/2002 | Tremblay ............ G06F 9/3824 712/E9.046 |
| 2003/0009621 | A1 | 1/2003 | Gruner |
| 2004/0098563 | A1 | 5/2004 | Parthasarathy |
| 2012/0047332 | A1 | 2/2012 | Bannon et al. |
| 2012/0204008 | A1 | 8/2012 | Dockser et al. |
| 2015/0026153 | A1 | 9/2015 | Snyder, II et al. |
| 2015/0261535 | A1 | 9/2015 | Snyder, II et al. |
| 2016/0179677 | A1* | 6/2016 | Matas .................. G06F 9/3816 711/129 |
| 2016/0337426 | A1* | 11/2016 | Shribman ............ H04L 65/612 |
| 2018/0210730 | A1 | 7/2018 | Sankaralingam et al. |
| 2019/0205139 | A1 | 7/2019 | Hughes |
| 2020/0004550 | A1 | 1/2020 | Thakker |
| 2020/0218540 | A1 | 7/2020 | Kesiraju et al. |

FOREIGN PATENT DOCUMENTS

| | | |
|---|---|---|
| WO | 2008042297 A2 | 4/2008 |
| WO | 2018111228 A1 | 6/2018 |

OTHER PUBLICATIONS

IPRP, PCT/US2020/012232, dated Jul. 22, 2021, 11 pages.
Examination Report, IN Application No. 202117027435, dated Mar. 10, 2022, 6 pages.
Office Action in Korean Appl. No. 10-2021-7021408 dated Jan. 10, 2023, 4 pages.

* cited by examiner

| Pipe 0 | Pipe 1 | Bundle Status | Pipe 0 Action | Pipe 1 Action |
|---|---|---|---|---|
| Cop | Non-Cop | N/A | Send Cop Payload to CIF | Send Command to CIF, Block Non-Cop |
| Non-Cop | Cop | Not Open | Send Non-Cop to DCache/CIF | Send Cop Payload to CIF |
| Non-Cop | Cop | Open | Send Command to CIF, Block Non-Cop | Block Cop |
| Cop | Cop | N/A | If 2 Op Slots Available, Merge and Send | If Closing Buffer, Send Command |
| Cop | Cop | N/A | If Only 1 Op Slot Available, Send | If Only 1 Op Slot Available, Block Cop |
| Non-Cop | Non-Cop | Not Open | Send Non-Cop to DCache/CIF | Send Non-Cop to DCache/CIF |
| Non-Cop | Non-Cop | Open | Send Command to CIF, Block Non-Cop | Block Non-Cop |

Fig. 7

| Bundle Count | Pipe 0 | Pipe 1 | Close Bundle | Block 0 | Block 1 |
|---|---|---|---|---|---|
| 2 | F | F | 0/1 | 0 | 0 |
| 3 | NF | F | 1 | 0 | 0 |
| 3 | F | NF | 1 | 0 | 0 |
| 3 | F | F | 0/1 | 0 | 0 |
| 4 | NF | NF | 1 | 0 | 0 |
| 4 | NF | F | 1 | 0 | 0 |
| 4 | F | - | 1 | 0 | 0 |
| 4 | F | NF | 1 | 0 | 0 |
| 4 | F | F | 1 | 0 | 1 |
| 5 | NF | - | 1 | 0 | 0 |
| 5 | NF | NF | 1 | 0 | 0 |
| 5 | NF | F | 1 | 0 | 1 |
| 5 | F | - | 1 | 0 | 0 |
| 5 | F | NF | 1 | 0 | 1 |
| 5 | F | F | 1 | 0 | 1 |
| 6 | NF | - | 1 | 0 | 0 |
| 6 | NF | NF | 1 | 0 | 1 |
| 6 | NF | F | 1 | 0 | 1 |
| 6 | F | - | 1 | 1 | 1 |
| 7 | - | - | 1 | 1 | 1 |

COPROCESSOR OPERATION BUNDLING

This application is a continuation of U.S. patent application Ser. No. 16/242,151, filed on Jan. 8, 2019 and now U.S. Pat. No. 11,210,100. The above application is incorporated herein by reference in its entirety.

BACKGROUND

Technical Field

Embodiments described herein are related to coprocessors and, more particularly, to transmitting instructions to coprocessors.

Description of the Related Art

Processors are a critical component of many digital systems, often determining how much performance and/or power efficiency can be achieved in the system. In some cases, a subset of the instruction set implemented by the processors can be implemented in a coprocessor that can be higher performance and/or more efficient at executing the instructions than the processor. Alternatively, instructions can be added to the instruction set that are specifically designed to be executed by the coprocessor, using specialized hardware that a general purpose processor would not implement.

Once a coprocessor is added to the system, it can be challenging to efficiently transport instructions to the coprocessor. Not only does the processor need to transmit the instructions to the coprocessor in an efficient manner, but also the processor needs to provide enough instructions to the coprocessor to keep the coprocessor busy in cases where the code being executed includes significant numbers of coprocessor instructions.

SUMMARY

In an embodiment, a processor includes a buffer in an interface unit configured to store cache lines of data to be transmitted from the processor to other components in a system including the processor (e.g., to a second level cache or other level of cache in the system, or the memory). The buffer may also be used to accumulate coprocessor instructions to be transmitted to a coprocessor. In an embodiment, the processor issues the coprocessor instructions to the buffer when ready to be issued to the coprocessor. The interface unit may accumulate the coprocessor instructions in the buffer, generating a bundle of instructions. The bundle/buffer entry may be closed based on various predetermined conditions (e.g., bundle complete, timer expiration, or detection of certain other instructions), and then the bundle may be transmitted to the coprocessor. In an embodiment, the issuance of instructions to the buffer, the closure of the bundle/buffer, and the transmission of the bundle to the coprocessor may be designed to ensure that, if a sequence of coprocessor instructions appears consecutively in a program, the rate at which the instructions are provided to the coprocessor (on average) at least matches the rate at which the coprocessor consumes the instructions.

BRIEF DESCRIPTION OF THE DRAWINGS

The following detailed description makes reference to the accompanying drawings, which are now briefly described.

FIG. 7 is a table illustrating one embodiment of parallel pipelines for issuing coprocessor and non-coprocessor operations to the CIF.

FIG. 8 is a table illustrating another embodiment for issuing coprocessor instructions to the CIF.

Figure 1:
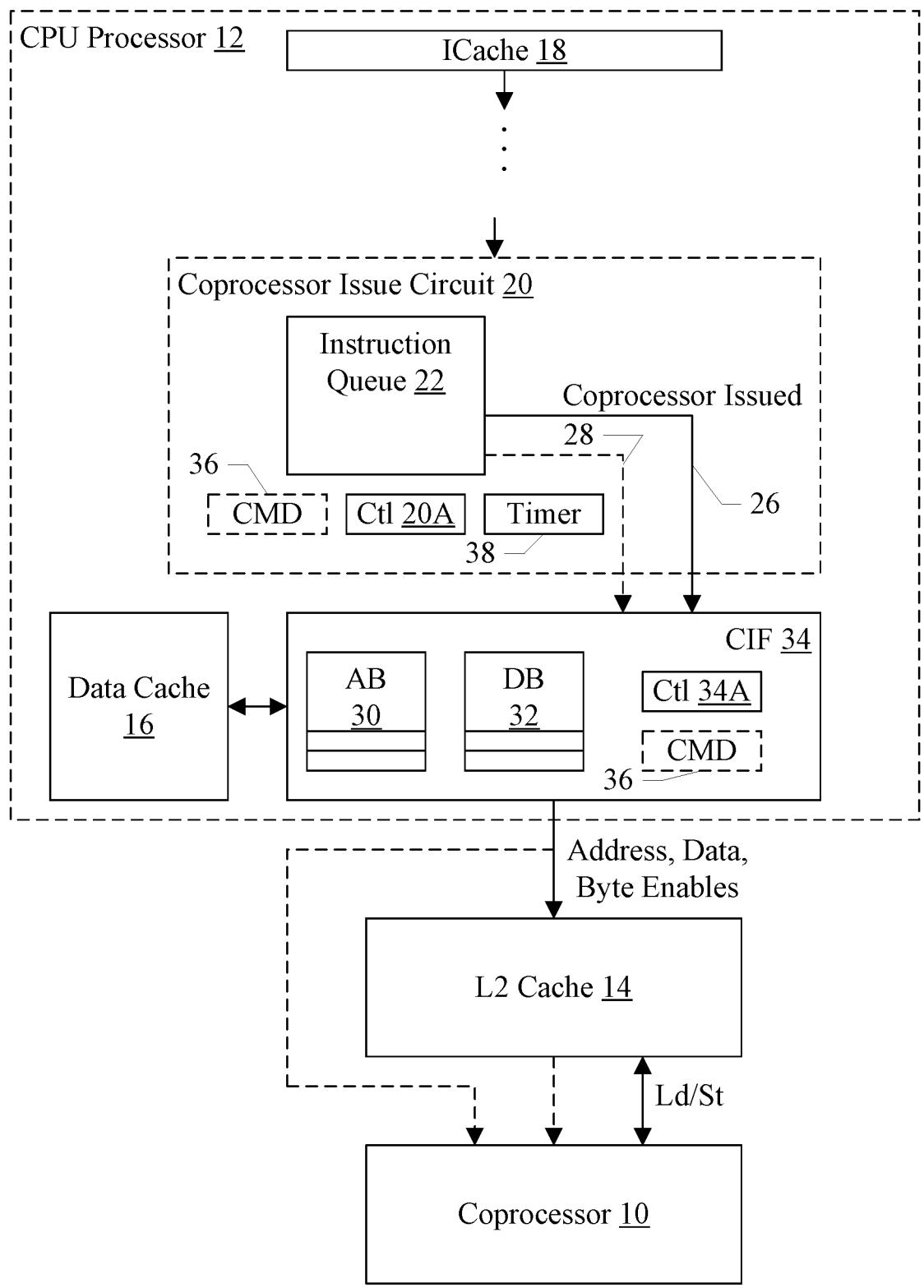
FIG. 1 is a block diagram of one embodiment of a processor, a coprocessor, and a second level (L2) cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g., directly connected or indirectly connected through one or more other circuits) and/or communicatively coupled.

DETAILED DESCRIPTION OF EMBODIMENTS

Turning now to FIG. 1, a block diagram of one embodiment of an apparatus including a CPU processor 12, a coprocessor 10, and a level two (L2) cache 14 is shown. In the illustrated embodiment, the CPU processor 12 is coupled to the L2 cache 14 and the coprocessor 10. In some embodiments, the coprocessor 10 may be coupled to the L2 cache 14 as well. The CPU processor 12 may further include an instruction cache (ICache) 18, a data cache (DCache) 16, and one or more pipeline stages (illustrated as the ellipses in FIG. 1, along with the coprocessor issue circuit 20 and the core interface unit (CIF) 34, each of which may implement one or more pipeline stages of the pipeline). The coprocessor issue circuit 20 is coupled to the pipeline to receive coprocessor instructions, and includes an instruction queue 22 to store the coprocessor instructions. The coprocessor issue circuit 20 is coupled to the CIF 34, which is further coupled to the L2 cache 14, the DCache 16, and optionally to the coprocessor 10. In some embodiments, circuits may be coupled if they are electrically coupled (e.g., directly connected or indirectly connected through one or more other circuits) and/or communicatively coupled.

The coprocessor 10 may be configured to perform one or more computation operations and one or more coprocessor load/store operations. The coprocessor 10 may employ an instruction set, which may be a subset of the instruction set implemented by the CPU processor 12. The CPU processor 12 may recognize instructions implemented by the coprocessor 10 and may communicate the instructions to the coprocessor 10.

More particularly, the CPU processor 12 may provide the coprocessor instructions to the coprocessor issue circuit 20, which may queue the coprocessor instructions in the instruction queue 22. The coprocessor issue circuit 20 may be configured to issue the coprocessor instructions to the CIF 34 for transmission to the coprocessor 10, using one or more "coprocessor issued" paths shown in FIG. 2 (e.g., path 26 and optional parallel path 28). The paths may be pipelines of one or more stages to transmit the coprocessor instructions to the CIF 34. In an embodiment, when more than one path/pipeline is provided, the paths/pipelines may be independent and may thus permit more than one coprocessor instruction to be issued in parallel to the CIF 34.

The CIF 34 includes an address buffer 30 and a data buffer 32 in the illustrated embodiment. The address buffer 30 may include multiple entries, and the data buffer 32 may include multiple entries as well. Each entry of the address buffer 30 may correspond to a respective entry of the data buffer 32. In an embodiment, the data buffer entries may each be configured to store a cache line of data from the DCache 16. The cache line of data may have been evicted from the DCache 16 and may be stored in the CIF 34 for transmission to the L2 cache 14 for storage. The corresponding address buffer entry may store the address of the cache line, as well as other data related to the cache line including data identifying the entry as being a cache line eviction. Thus, CIF 34 may be normally designed to transmit one operation on the interface to the L2 cache 14 (one cache block). In addition to cache block evictions, the CIF 34 may also enqueue various cache maintenance operations (e.g., cache flushes) at one operation per entry, cache fill requests for the DCache 16 and ICache 18 at one operation per entry, etc.

When coprocessor instructions are being issued, the data buffer 32 may accumulate coprocessor instructions in a bundle to be transmitted to the coprocessor 10. The corresponding address buffer entry may store data indicating that the entry is accumulating coprocessor instructions, but there may not be an explicit address for the address buffer entry to store. The coprocessor issue circuit 20 may transmit data corresponding to one or more issued coprocessor instructions, and the CIF 34 may allocate a data buffer entry to accumulate the instructions. Additional coprocessor instructions may subsequently be issued by the coprocessor issue circuit 20. The CIF 34 may merge the additional coprocessor instructions into the bundle.

Various conditions may cause the coprocessor issue circuit 20 to close the bundle (described in more detail below). A command may be associated with the bundle, and may be written to the data buffer 32 when the bundle is closed (that is, the command may be part of the bundle). Alternatively, the command may be written to the address buffer 30 or another storage location, in other embodiments. The command may be accumulated by the coprocessor issue circuit 20, or may be accumulated by the CIF 34, in various embodiments. The command accumulation is this illustrated in dotted form (CMD 36) in the coprocessor issue circuit 20/CIF 34. The CMD 36 may be, e.g., a storage device such as a register, a set of flip flops (flops), etc. to store the accumulated command information. The combination of the command and the data transmitted for each coprocessor instruction may identify the coprocessor instructions to the coprocessor 10. Additional details will be provided below.

This description may refer to having an open bundle and closing the bundle (at which time additional coprocessor instructions may not be added to the bundle and the bundle is ready to transmit to the coprocessor 10). This description may also refer to an open buffer entry in the CIF 34, and closing the buffer entry. The two descriptions may be essentially synonymous: a bundle may be open if the buffer entry storing the bundle is open, and the bundle may be closed if the buffer entry is closed and is arbitrating with other buffer entries to transmit on the CIF interface to the coprocessor 10.

The coprocessor issue circuit 20 and the CIF 34 may attempt to transmit coprocessor instructions to the coprocessor 10 at a rate that matches the rate that the coprocessor 10 may consume instructions. That is, if a code sequence includes numerous coprocessor instructions in series, the coprocessor issue circuit 20 and the CIF 34 attempt to provide instructions to the coprocessor 10 to permit the coprocessor 10 to consume instructions at its maximum rate. For example, in one embodiment, the coprocessor 10 may be configured to consume up to two coprocessor instructions per clock cycle. The coprocessor issue circuit 20 may attempt to issue two coprocessor instructions per clock cycle whenever instructions are available and issuable. The CIF 34 may accumulate the instructions, then transmit the bundle to the coprocessor 10. If a series of coprocessor instructions are encountered in a code sequence, the bundle may be generated at a rate of two instructions per clock cycle and may be transmitted as one bundle, providing an average of two instructions per clock cycle to the coprocessor 10. In another embodiment, the coprocessor 10 may be configured to consume up to three instructions per clock cycle. The coprocessor issue circuit 20 and the CIF 34 may attempt to bundle instructions at a three instruction per clock cycle rate, and transmit the bundles to the coprocessor 10 to support an average of three instructions per clock. Any rate may be implemented in various embodiments. The rates of two and three instructions per clock are merely examples for this disclosure.

In one embodiment, the CIF 34 may transmit the bundle directly to the coprocessor 10 (e.g., the coprocessor 10 may be coupled to the interface between the L2 cache 14 and the CPU processor 12, or there may be a separate interface between the CPU processor 12 and the coprocessor 10 and the CIF 34 may transmit the bundle on the separate interface). In another embodiment, the CPU processor 12 may transmit the bundle to the L2 cache 14, in a manner similar to evicted cache lines or cache maintenance operations. The L2 cache 14 may detect the bundle of coprocessor instructions and route the bundle to the coprocessor 10. These options are illustrated in FIG. 1 by the dotted lines between the CPU processor 12 and the coprocessor 10, and between the L2 cache 14 and the coprocessor 10.

The interface to the L2 cache 14 may include an address bus, a data bus, and byte enables. For communications to the L2 cache 14 itself (e.g., cache evictions, cache maintenance operations, etc.), the address bus may carry information identifying the operation being performed, as well as the affected address. The data bus may carry the cache line, if the CPU processor 12 has cache data to transmit for the operation. The byte enables may identify which bytes of the data bus are valid. When transmitting a coprocessor instruction bundle, the CPU processor 12 may transmit the bundle on the data bus, and the address bus may include information identifying the transmission as bundle of coprocessor instructions. In another embodiment, since there is no address associated with the bundle, the address may be used to transmit some of the bundle. For example, the command may be transmitted on the address bus, and the remaining bundle data may be transmitted on the data bus. In yet another embodiment, the command may include a valid indication identifying a number of coprocessor instructions in the bundle, and thus the byte enables need not be used for transmitting bundles. The byte enables may be used to transmit the command in such embodiments. For embodiments in which the command is transmitted on the byte enables or address bus, additional coprocessor instructions may be included in a bundle in the space that would have been occupied by the command.

Based on the address bus information identifying the transmission as a coprocessor instruction bundle, the L2 cache 14 may be configured to route the bundle to the coprocessor 10. The coprocessor 10 may receive the bundle (e.g., in an instruction buffer, shown in FIG. 6 and discussed below) and may consume the instructions from the bundle.

As mentioned above, various conditions may cause the bundle to be closed. In one embodiment, a timer 38 may be used as one condition to close the buffer. The timer 38 may be initialized when the bundle is started with an initial one or more coprocessor instructions, and may be updated each clock cycle. When the timer 38 expires, the bundle may be closed. The timer 38 may be initialized to a desired number of clock cycles and decremented, expiring when it reaches zero. Alternatively, the timer 38 may be initialized to zero and incremented, expiring when it reached the desired number of clock cycles. The desired number of clock cycles may be fixed or programmable, in various embodiments. While the timer 38 is implemented in the coprocessor issue circuit 20 in the illustrated embodiment, other embodiments may implement the timer 38 in the CIF 34.

In an embodiment, operations may be issued from the instruction queue 22 when they are no longer speculative. Generally, an instruction or operation may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the CPU processor 12 and the instruction itself is also known not to cause an exception/speculative flush. Some instructions may be known not to cause exceptions based on the instruction set architecture implemented by the CPU processor 12 and may also not cause speculative flushes. Once the other prior instructions have been determined to be exception-free and flush-free, such instructions are also exception-free and flush-free.

The CPU processor 12 may be responsible for fetching the instructions executed by the CPU processor 12 and the coprocessor 10, in an embodiment. The CPU processor 12 may be configured to decode instructions into operations. In some embodiments, there may be a one-to-one correspondence between instructions and operations (e.g., a given instruction may decode into one operation). In such cases, instruction and operation may be effectively synonymous, although the operation may be modified in form by the decoder or other circuitry in the CPU processor 12. In other embodiments, at least some instructions may be decoded into multiple operations. The multiple operations, when executed, may implement the operation specified for the corresponding instructions. Combinations of instructions which decode one-to-one and instructions which decode one-to-multiple may be supported in an embodiment. Some instructions may be microcoded as well, in an embodiment. Thus, load/store operations may be instructions, or may be one of the operations decoded from a given instruction.

In an embodiment, the CPU processor 12 may be configured to detect consecutive coprocessor instructions in a code sequence and fuse the consecutive coprocessor instructions into a fused instruction. The instructions may be consecutive in the code sequence if they are adjacent in program order (e.g., no other instruction intervenes between the adjacent coprocessor instructions in program order). The fused instruction progresses as a single instruction down the pipeline of the CPU processor 12 and is written to the instruction queue 22 as a single instruction. Instruction fusion may be used to increase the rate at which instructions are bundled and issued to the CIF 34 using one coprocessor issue path 26 or 28, but occupying two slots in the bundle for the two instructions.

While the communication path between the CPU processor 12 and the L2 cache 14/coprocessor 10 is described above as an address bus and data bus, any type of communication may be used in various embodiments. For example, a packet-based communication system could be used to transmit memory requests to the L2 cache 14 and/or system memory and instructions to the coprocessor 10.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. For example, the DCache 16 may have a smaller cache line size than the L2 cache 14, in an embodiment. The instruction cache 18 and DCache 16 may each be a cache having any desired capacity, cache line size, and configuration. Similarly, the L2 cache 14 may be any capacity, cache line size, and configuration. The L2 cache 14 may be any level in the cache hierarchy (e.g., the last level cache (LLC) for the CPU processor 12, or any intermediate cache level between the CPU processor 12/coprocessor 10 and the main memory system). There may be more levels of cache between the CPU DCache 16/ICache 18 and the L2 cache 14, and/or there may be additional levels of cache between the L2 cache 14 and the main memory.

The above discussion has described the coprocessor issue circuit 20 and the CIF 34 being configured to perform various operations in this discussion. Each of coprocessor issue circuit 20 and the CIF 34 may include control logic circuitry (e.g., illustrated as control logic 20A and 34A, respectively in FIG. 1) implementing the operations.

Figure 2:
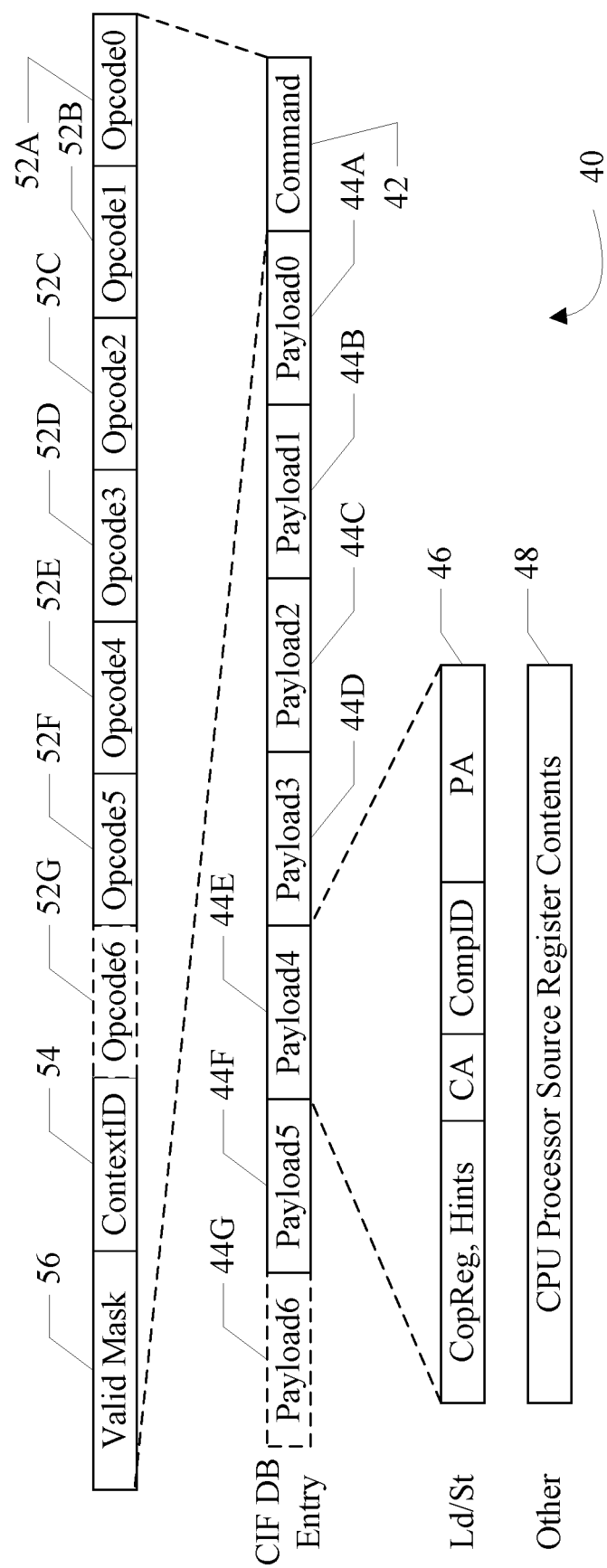
FIG. 2 is a block diagram of one embodiment of a core interface unit (CIF) data buffer entry.

Turning now to FIG. 2, a block diagram illustrating one embodiment of a CIF data buffer entry 40 when it is accumulating/storing a bundle of coprocessor instructions is shown. The data buffer entry 40 may be a cache line in size, as previously mentioned. In one embodiment, the cache line may be 64 bytes. Additionally, the data describing each coprocessor instruction (in addition to the opcode included in the command, in an embodiment) may be 64 bits (8 bytes). The command may also be 64 bits (8 bytes) in an embodiment. Other embodiments may employ different cache line sizes and instruction data/command sizes.

In the embodiment shown in FIG. 2, the data buffer entry 40 is divided into slots for the command (reference numeral 42) and one or more instruction payloads (reference numerals 44A-44G). The instruction payloads may be the instruction data issued by the coprocessor issue circuit 20 for each instruction. In one embodiment, the instruction payload may be the entirety of the instruction. In the embodiment shown, however, the opcode for each instruction is included in the command 40 as discussed below. A given instruction payload 44A-44G and the corresponding opcode, when taken together, may describe the instruction to the coprocessor 10. That is, a given instruction is defined by its opcode and payload. By decoding the opcode and payload, the coprocessor 10 may determine the instruction to be executed, the location of operations of the instruction in the coprocessor, etc.

The instruction payload 44E is shown in exploded view in FIG. 2 for two types of coprocessor instructions: load/store instructions and other instructions (e.g., computation instructions). The payload for load/store instructions is illustrated at reference numeral 46, and the payload for computation instructions is illustrated at reference numeral 48. Each instruction payload 44A-44G may be similar to the instruction payload 44E as shown in the exploded view, depending on whether the instruction is a load/store or compute instruction.

In an embodiment, the coprocessor computation instructions may be defined to have an opcode and a CPU processor register as a source operand when fetched by the CPU processor 12. The CPU processor register may be an integer register, and more particularly may be a 64 bit integer register in this embodiment. The contents of the CPU processor register, along with the opcode, may define the instruction to the coprocessor 10. For example, the contents of the CPU processor register may specify operands within the coprocessor 10, and may further specify the instruction (e.g., the opcode detected by the CPU processor 12 may define a group of instructions and the contents of the CPU processor register may select one of the instructions from the group). Thus, the instruction as transmitted to the coprocessor 10 may be the opcode (in the command, in this embodiment) and the contents of the source register as the payload 48.

For load/store instructions, the CPU processor 12 may be responsible for translating the address of the memory location read/written in response to the load/store instruction. Thus, the payload 46 includes a PA field for the physical address of the load/store operation. There may also be a completion ID (CompID) field which identifies the coprocessor load/store operation to the CPU processor 12 when it is completed, for ordering purposes with CPU load/store operations. One or more cache attributes (CA) may be included, which may be determined from the address translation and/or other sources in various embodiments. Cache attributes may include one or more of a cacheable/uncacheable attribute, a write through attribute, a coherent/non-coherent attribute, etc. Cache attributes may affect the behavior of caches in the memory hierarchy with respect to the data accessed by the load/store instruction. For example, the caches may determine whether or not to cache the data, how to handle writes to the data, etc. based on the cache attributes. The payload 46 may further specify the target (load) or source (store) register within the coprocessor 10 for the load/store data (CopReg), and in some embodiments may further include one or more hints regarding the use of the data (e.g., temporal vs. non-temporal, etc.) which may be used by the L2 cache 14 for caching the data in addition to the cache attributes.

As shown in FIG. 2, the bundle may have up to 7 instructions (corresponding to the 7 payloads 44A-44G shown in FIG. 2). Embodiments in which the command is transmitted on the address bus or byte enables may include a payload in the place of the command 42. However, not all embodiments may support a full 7 instruction payload. For example, payload 44G is shown in dotted form in FIG. 2 to illustrate the payload 44G may not be used in some embodiments. Similarly, the corresponding opcode field in the command is shown in dotted form. An embodiment in which the coprocessor 10 consumes up two instructions per cycle may not include the payload 44G. Since the first six payloads may be provided at two instructions per cycle (in the case of a stream of consecutive coprocessor instructions), a two instruction per clock average may be maintained if the bundles have an even number of coprocessor instructions. Accordingly, for such an embodiment, a bundle may be defined to be complete when the bundle has 6 instructions. The space where payload 44G would be located in the data buffer may be reserved (not used).

On the other hand, an embodiment in which the coprocessor consumes up to three instructions per clock cycle may benefit from including the payload 44G, depending on how the instructions fill the bundle. Additional details are for an example of such an embodiment are described below with regard to FIG. 8.

The command 42 is shown in exploded view in FIG. 2 as well, for an embodiment. The command 42 may include opcode fields for each opcode in the bundle (reference numerals 52A-52G corresponding to payloads 44A-44G, respectively, in this embodiment). As mentioned previously, the opcode 52G may not be included in some embodiments, and the corresponding field on the command may be reserved in such an embodiment. The command 42 may also include a context ID field 54, which may identify a processor context that sourced the coprocessor instructions. The command 42 may include a valid indication 56 to identify which instructions in the bundle are valid. For example, the valid indication may be a mask with a bit for each coprocessor instruction, which may be set to indicate the instruction is valid (e.g., present in the bundle) and clear to indicate that the instruction in invalid (e.g., not present in the bundle). The opposite meanings for the set and clear states of the bit may also be used if desired. Other embodiments may use other valid indications. For example, the instructions in the bundle may be provided in order from payload 0 to payload 6. Accordingly, a count of instructions may be used as the valid indication, for example.

Figure 3:
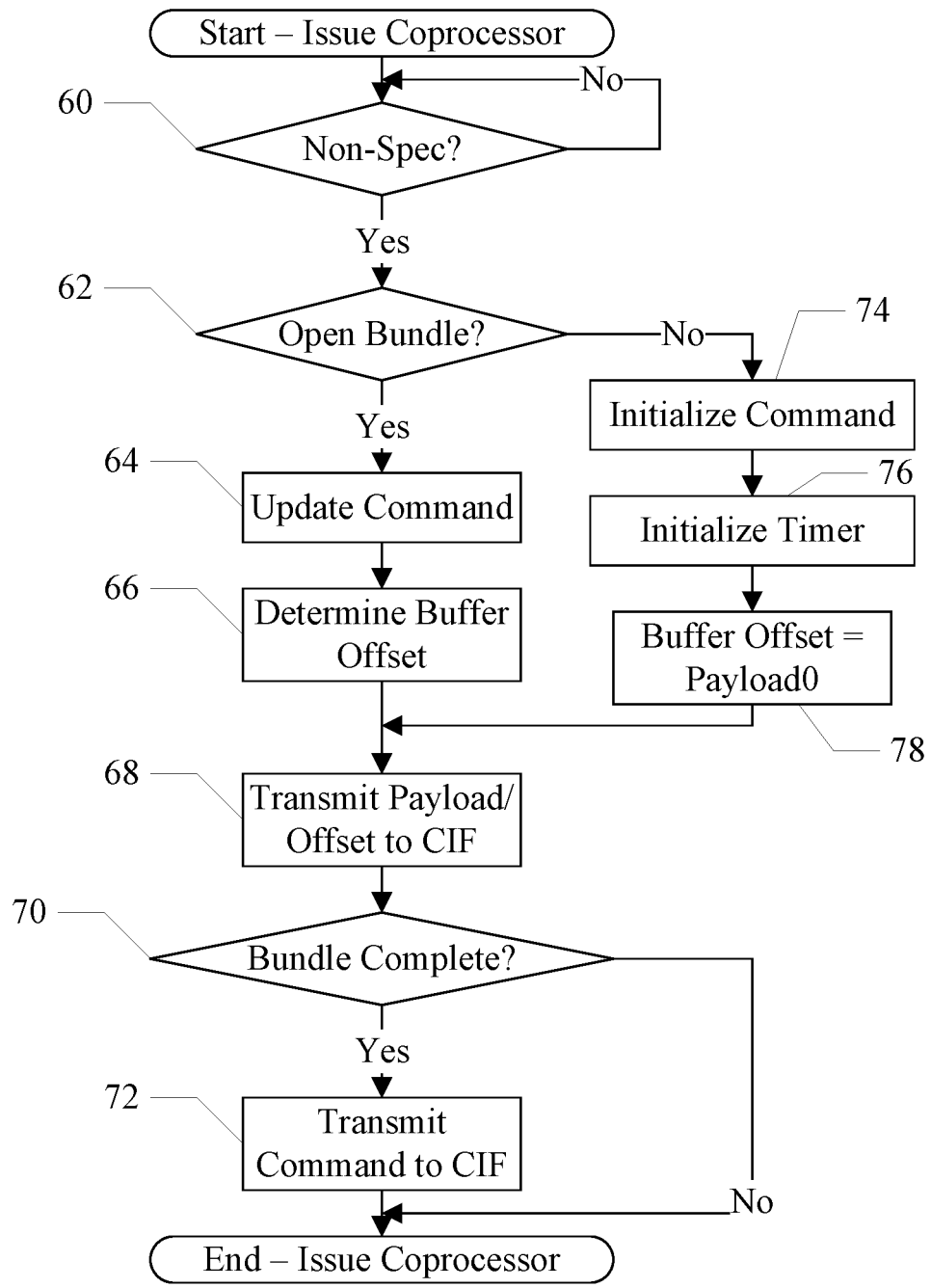
FIG. 3 is a flowchart illustrating operation of one embodiment of a coprocessor issue circuit in response to a coprocessor instruction.

Turning next to FIG. 3, a flowchart is shown illustrating operation of the coprocessor issue circuit 20 to issue a coprocessor instruction that is at the head of the instruction queue 22. Similar operation may be performed in parallel to identify additional issuable coprocessor instructions, for embodiments that transmit multiple instruction operations in parallel to the CIF 34. While the blocks are shown in a particular order for ease of understanding, other orders may be used. Blocks, combinations of blocks, and/or the flowchart as a whole may be pipelined over multiple clock cycles. The coprocessor issue circuit 20, or components thereof, may be configured to implement the operation illustrated in FIG. 3.

As mentioned previously, the coprocessor issue circuit 20 may wait for the coprocessor instruction to become non-speculative prior to issuing the instruction (decision block 60). Once the coprocessor instruction is non-speculative (decision block 60, "yes" leg), the coprocessor issue circuit 20 may determine if there is an open bundle (decision block 62). There may be an open bundle if one or more previous coprocessor instructions have been issued to the bundle, but the bundle is not yet complete or closed for another reason. If there is an open bundle (decision block 62, "yes" leg), the coprocessor issue circuit 20 may update the command to indicate the coprocessor instruction (e.g., writing the opcode to the next open opcode field 52A-52G and updating the valid mask 56) (block 64). The coprocessor issue circuit 20 may determine the offset into the data buffer 32 at which the instruction payload is to be written to merge the data into the data buffer 32 (block 66). For example, in the embodiment of FIG. 2, the offset for payload 0 may be 8 bytes (since the command is 8 bytes beginning at offset 0), the offset for payload 1 may be 16 bytes, etc. Other embodiments may have different offsets depending on the bundle definition and the size of the payloads and command. The instructions may be filled into the bundle in program order, so the first instruction in the bundle may be offset at 8 bytes, then second instruction offset at 16 bytes, etc. The coprocessor issue circuit 20 may transmit the payload and offset to the CIF 34 to update the bundle in the data buffer 32 (block 68). In embodiments in which the CIF 34 generates the command, block 64 may be performed in the CIF 34 in response to receiving the payload and offset. Additionally, the opcode may be transmitted to the CIF 34 with the payload for embodiments in which the CIF 34 accumulates the command.

If the transmission of the coprocessor instruction completes the bundle (decision block 70, "yes" leg), the coprocessor issue circuit 20 may also transmit the command to the CIF 34 (for embodiments in which the coprocessor issue circuit 20 generates the command) (block 72). The command may be transmitted in parallel with the payload (e.g., in an unused pipeline or path 26/28), or subsequent to the payload, in various embodiments. The command may be transmitted with offset 0, and the update at offset 0 may signal to the CIF 34 that the bundle is complete, in an embodiment. Alternatively, signaling between the coprocessor issue circuit 20 and the CIF 34 may identify the command transmission or payload transmission. For embodiments in which the command is generated in the CIF 34, the coprocessor issue circuit 20 may signal the CIF 34 that the bundle is complete (or for other bundle closure reasons, described in more detail below).

If there is no open bundle (decision block 62, "no" leg), the coprocessor issue circuit 20 may be configured to initialize the command (block 74) and may also be configured to initialize the timer 38 (block 76). The buffer offset in this case may be the offset to payload 0 (block 78). The coprocessor issue circuit 20 may transmit the payload and offset to the CIF 34 (block 68). The bundle may not be complete in this case (decision block 70, "no" leg). In some cases, a single instruction bundle may be generated due to other bundle closure conditions such as those discussed below with respect to FIG. 4. In embodiments in which the CIF 34 accumulates the command and/or implements the timer 38, blocks 74 and/or 76 may be implemented in the CIF 34, respectively.

Figure 4:
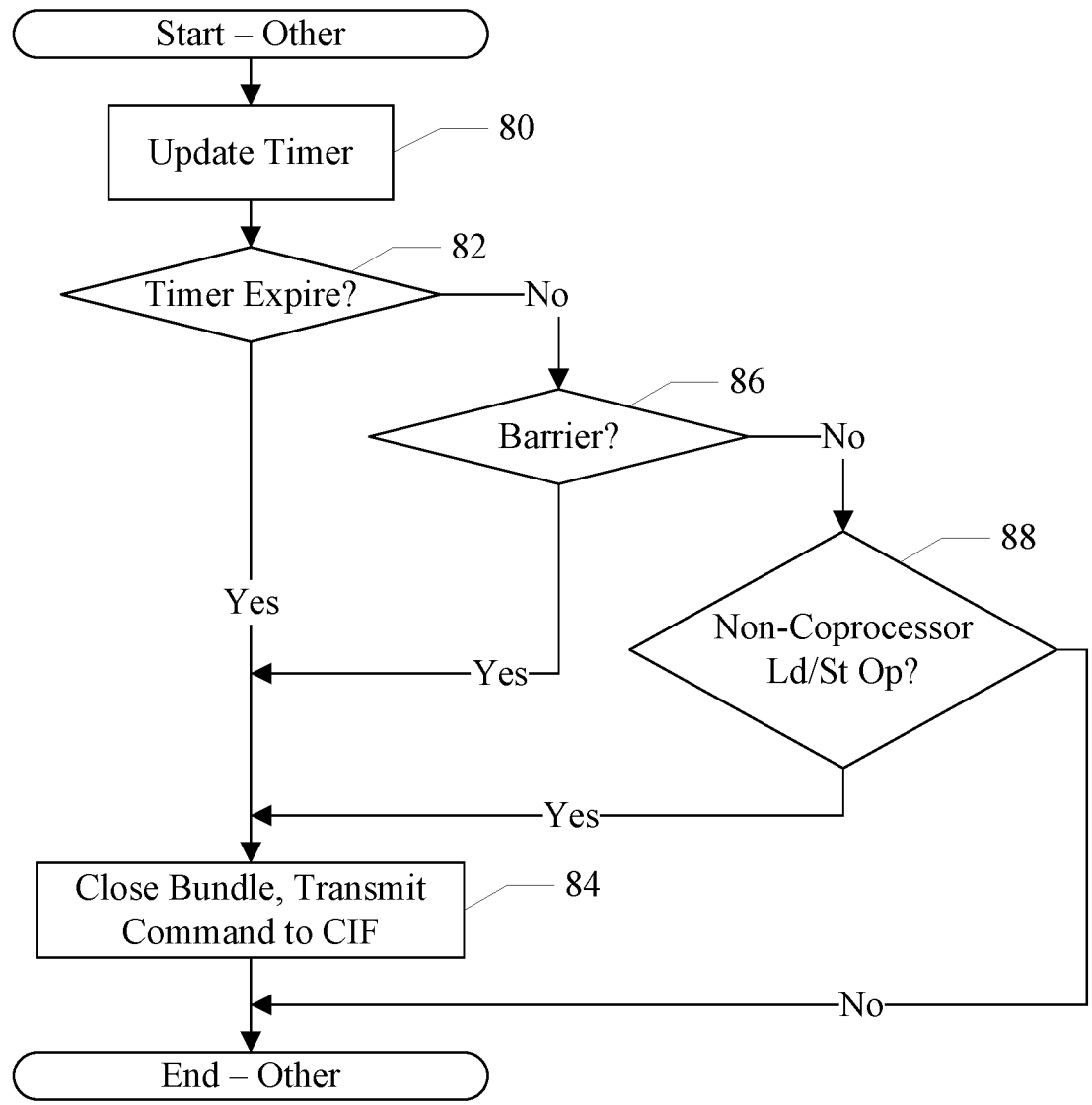
FIG. 4 is a flowchart illustrating additional operation of one embodiment of the coprocessor issue circuit.

FIG. 4 is a flowchart illustrating operation of one embodiment of the coprocessor issue circuit 20 for other processing related to bundling coprocessor instructions. While the blocks are shown in a particular order for ease of understanding, other orders may be used. Blocks, combinations of blocks, and/or the flowchart as a whole may be pipelined over multiple clock cycles. The coprocessor issue circuit 20, or components thereof, may be configured to implement the operation illustrated in FIG. 4.

The coprocessor issue circuit 20 may update the timer each clock cycle (e.g., decrementing the timer) while there is an open bundle (block 80). If the timer expires (decision block 82, "yes" leg), the coprocessor issue circuit 20 may close the bundle and transmit the command to the CIF 34 (block 84). As mentioned previously, this operation many be implemented in the CIF 34, in other embodiments.

Additionally, the presence of a barrier instruction in the instruction stream may cause the coprocessor issue circuit 20 to close the buffer and transmit the command to the CIF 34 (decision block 86, "yes" leg and block 84). The bundle may include coprocessor load/store instructions, which would need to complete before the barrier instruction completes. Generally, a barrier instruction may be an instruction that is defined in the instruction set architecture of the CPU processor 12 to cause, when executed, preceding memory operations in program order to be completed to a certain point before the barrier instruction completes. For example, the preceding memory operations may be completed to the point that they are "globally visible." A memory operation may be globally visible if it is observed or observable to all other memory-accessing devices (e.g., other processors) in the system. In some embodiments, the CPU processor 12 may also ensure that no memory operations that are subsequent to the barrier in program order are permitted to be performed until the barrier instruction completes. In other embodiments, the barrier instruction may cause the bundle to close only if the bundle includes one or more coprocessor load/store instructions.

If the CPU processor 12 encounters a non-coprocessor load/store operation (e.g., a CPU load/store—decision block 88, "yes" leg), the coprocessor issue circuit 20 may close the bundle and transmit the command to the CIF 34 (block 84). The bundle may include coprocessor load/store instructions, which could access the same address as the non-coprocessor load/store instruction. In this context, load/store instructions may access the same address if at least one byte is accessed by both of the instructions. Such coprocessor load/store instructions may be required to complete before the non-coprocessor load/store instructions. In other embodiments, the non-coprocessor load/store operation may cause the closing of the bundle only if the bundle includes one or more coprocessor load/store instructions. In still other embodiments, the non-coprocessor load/store operation may cause the closing of the bundle only if the bundle includes at least one coprocessor load/store instruction to the same address as the non-coprocessor load/store instruction.

In embodiments in which the CIF 34 assembles the command, the coprocessor issue circuit 20 may transmit an indication that the bundle is closing and the CIF 34 may complete the command and close the bundle. In still other embodiments, the CIF 34 may implement the timer and close the bundle, even if the coprocessor issue circuit 20 (or other CPU processor hardware) detects the other closure reasons shown in FIG. 4.

Figure 5:
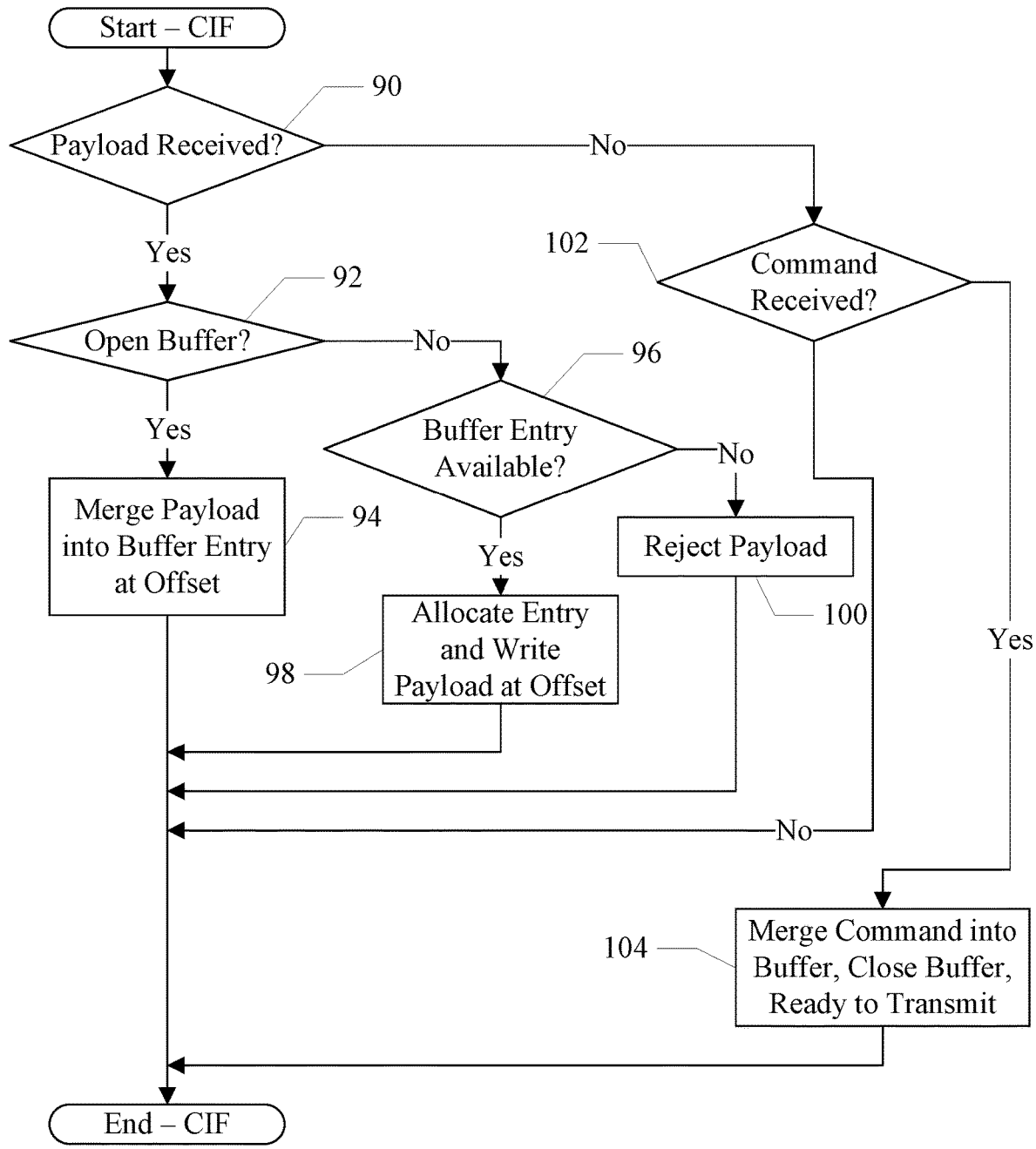
FIG. 5 is a flowchart illustrating operation of one embodiment of the CIF in response to coprocessor instructions.

Turning now to FIG. 5, a flowchart is shown illustrating operation of the CIF 34 for one embodiment. While the blocks are shown in a particular order for ease of understanding, other orders may be used. Blocks, combinations of blocks, and/or the flowchart as a whole may be pipelined over multiple clock cycles. The CIF 34, or components thereof, may be configured to implement the operation illustrated in FIG. 5.

If the CIF 34 receives one or more payloads (decision block 90, "yes" leg), and there is an open buffer entry/bundle in the data buffer 32 (decision block 92, "yes" leg), the CIF 34 may merge the payload(s) into the buffer entry at the offset(s) specified for those payloads (block 94). If there is no open buffer entry (decision block 92, "no" leg), but there is a data buffer entry available (decision block 96, "yes" leg), the CIF 34 may allocate the available buffer entry and write the payload at the specified offset (block 98). A buffer entry may be available if it is not currently allocated to another operation (e.g., another coprocessor instruction bundle, a cache line eviction, a fill request, etc.). That is, the buffer entry may be empty. Additionally, the CIF 34 may initialize the corresponding address buffer entry with data identifying the entry as a coprocessor instruction bundle. If there is no open buffer entry (decision block 96, "no" leg), the CIF 34 may reject the payload (block 100). There may be a mechanism in the interface between the CIF 34 and the coprocessor issue circuit 20 to communicate the rejection. For example, there may be an acknowledgement communicated from the CIF 34 to the coprocessor issue circuit 20 for each transmission, and the acknowledgement may be withheld. Alternatively, there may be a buffer full indication transmitted from the CIF 34 to the coprocessor issue circuit 20 and the buffer full indication may prevent the coprocessor issue circuit 20 from attempting to transmit a payload if there is no open buffer. In yet another alternative, a credit-based system may be used in which the CIF 34 issues one or more credits to the coprocessor issue circuit 20, where each credit corresponds to an available data buffer entry. The coprocessor issue circuit 20 may issue coprocessor instructions to an open bundle or, if there is no open bundle, the coprocessor issue circuit 20 may issue coprocessor instructions if there is a credit for an available buffer entry.

If a command is received (decision block 102, "yes" leg), the CIF 34 may merge the command into the buffer entry at offset zero and close the buffer entry/bundle (block 104). The bundle is ready to transmit to the coprocessor 10, and the CIF 34 may arbitrate the entry other buffer entries that are ready to transmit and ultimately transmit the bundle to the coprocessor 10, at which time the buffer entry may be invalidated and may become available for use for another operation or instruction bundle. As discussed previously, the CIF 34 may accumulate the command in other embodiments. In such embodiments, the CIF 34 may determine that the buffer entry is to close (or may receive an indication to close the buffer entry) and may update the buffer entry with the command.

Figure 6:
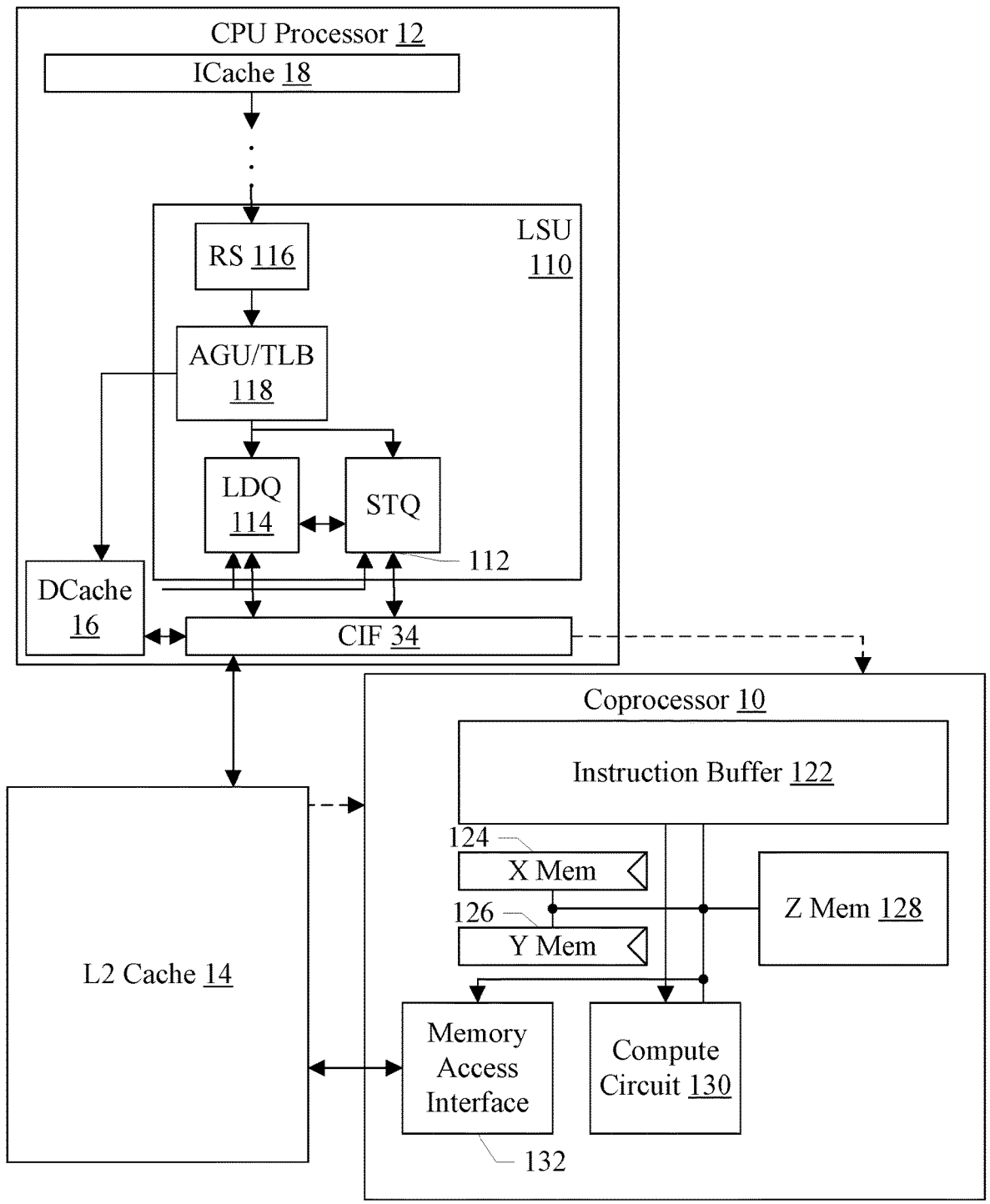
FIG. 6 is a block diagram of another embodiment of a processor, a coprocessor, and a second level (L2) cache.

Turning now to FIG. 6, a block diagram of another embodiment of the CPU processor 12, the coprocessor 10, and the L2 cache 14 is shown. In this embodiment, the CPU processor 12 includes a load/store unit (LSU 110) that also serves as the coprocessor issue circuit 20 for this embodiment. More particularly, the store queue 112 included in the LSU 110 may serve as the instruction queue 22, in addition to serving as a store queue for CPU store operations, as described in more detail below. Thus, the discussion above related to the coprocessor issue circuit 20 applies to the LSU 110 in this embodiment. That is, the LSU 110 may implement the operation described above for the coprocessor issue circuit 20.

In the embodiment of FIG. 6, the CPU processor 12 includes the instruction cache (ICache) 18 and one or more pipeline stages (illustrated as the ellipses in FIG. 1, along with the load/store unit 110 and the CIF 34, each of which may implement one or more pipeline stages of the pipeline). The LSU 110 may include a reservation station (RS) 116, an address generation unit (AGU)/translation lookaside buffer (TLB) 118, a load queue (LDQ) 114, and the store queue (STQ) 112. The reservation station 116 is coupled to a preceding pipeline state to receive load/store operations, coprocessor instructions, operand addresses, and other related data and is coupled to the AGU/TLB 118. The AGU/TLB 118 is coupled to the DCache 16, the LDQ 114, and the STQ 112. The LDQ 114 and STQ 112 are coupled to the DCache 16 and the CIF 34. The CIF 34 is further coupled to the coprocessor 10, the L2 cache 14, and the DCache 16.

In the embodiment of FIG. 6, the coprocessor 10 may include an instruction buffer 122, an X memory 124, a Y memory 126, a Z memory 128, a compute circuit 130, and a memory access interface 132 coupled to each other.

More particularly, the CPU processor 12 may be configured to transmit the coprocessor instructions/operations to the coprocessor 10 through the STQ 112 and the CIF 34, in an embodiment. The CIF 34 may be configured as shown and described in FIG. 1, and as mentioned above the STQ 112 may operate as the instruction queue 22 for coprocessor instructions. The STQ 112 may also store CPU store operations, which may be in program order in the STQ 112 with the various coprocessor instructions. In one embodiment, the coprocessor computation operations may be handled like CPU store operations in the CPU processor 12 until they reach the STQ 112 (except that the coprocessor compute operations may not include an address generation/translation in the AGU/TLB 118, in some embodiments, and may not access the DCache 16, in some embodiments). The coprocessor computation operations may be issued from the STQ 112 when no longer speculative, and may be transmitted through the CIF 34 to the coprocessor 10.

Coprocessor load/store operations may also be handled like CPU store operations in the CPU processor 12 until they reach the STQ 112, in an embodiment. The coprocessor load/store operations may include an address generation and translation by the AGU/TLB 118 as well, allowing the addresses accessed by the coprocessor load/store operations to be known prior to issuance of the coprocessor load/store operations to the coprocessor 10. The CPU processor 12 may use the coprocessor load/store addresses and addresses of CPU load/store operations to order CPU load/store operations and coprocessor load/store operations, even though the coprocessor load/store operations are actually executed in the coprocessor 10, independent of the CPU processor 12 once issued to the coprocessor 10.

Generally, CPU load/store operations and coprocessor operations may be received in the reservation station 116, which may be configured to monitor the source operands of the operations to determine when they are available and then issue the operations to the AGU/TLB 118. Some source operands may be available when the operations are received in the reservation station 116, which may be indicated in the data received by the reservation station 116 for the corresponding operation. Other operands may become available via execution of operations by other execution units (e.g., integer execution units, floating point execution units, etc. not shown in FIG. 6). The operands may be gathered by the reservation station 116, or may be read from a register file (not shown in FIG. 6) upon issue from the reservation station 116.

In an embodiment, the reservation station 116 may be configured to issue operations out of order (from their original order in the code sequence being executed by the CPU processor 12, referred to as "program order") as the operands become available. To ensure that there is space in the LDQ 114 or the STQ 112 for older operations that are bypassed by younger operations in the reservation station 116, an earlier pipeline stage in the CPU processor 12 may include circuitry that preallocates LDQ 114 or STQ 112 entries to operations transmitted to the load/store unit 110. For example, a register rename stage may assign rename registers to the architected registers specified in various instructions fetched by the CPU processor 12. The register rename stage may include allocation of LDQ 114 or STQ 112 entries. Particularly, in one embodiment, CPU load operations may be assigned LDQ 114 entries and CPU store operations and coprocessor operations (load, store, and computation) may be assigned STQ 112 entries. In other embodiments, the reservation station 116 may issue operations in program order and LDQ 114/STQ 112 assignment may occur at issue from the reservation station 116.

It is noted that, for coprocessor operations, the source operands that are determined as available by the reservation station 116 may be operands that are stored in the CPU processor 12. For example, the address operand(s) of the coprocessor load/store operations (which specify the address accessed by the load/store operations) may be stored in CPU registers (e.g., integer registers). The data source for a coprocessor store operation may be in the coprocessor 10 and may not be tracked by the reservation station 116. Similarly, computation operations may have a CPU register (e.g., integer register) which specifies additional information about the instruction (the payload described above), in an embodiment, but the operands of the computation operation itself may be stored in the coprocessor 10 and may not be tracked in the reservation station 116.

The AGU/TLB 118 may be configured to generate the address accessed by a load/store operation, and translate the address from an effective or virtual address created from the address operands of the load/store operation to a physical address actually used to address memory. The AGU/TLB 118 may be configured to generate an access to the DCache 16 for CPU load/store operations. For CPU load operations, data may be speculatively forwarded from the DCache 16 to the destination operand of the CPU load operation (e.g., a register in the CPU processor 12, not shown in FIG. 6), unless the address hits a preceding operation in the STQ 112 (that is, an older CPU store or coprocessor load/store operation in program order) or a memory ordering table used to order memory operations outstanding in the coprocessor 10 with CPU load/store memory operations. The cache hit/miss status from the DCache 16 may be logged for CPU store operations in the STQ 112 for later processing.

The CPU load operations may be written to the LDQ 114, and the CPU store operations and coprocessor load/store operations may be written to the STQ 112, to enforcing ordering among operations. The coprocessor computation operations may be ordered in the STQ 112 as well for program order, but may not have memory ordering considerations. In one embodiment, the instruction set architecture implemented by the CPU processor 12 and the coprocessor 10 may permit memory accesses to different addresses to occur out of order but may require memory accesses to the same address to occur in program order.

A memory ordering table (not shown) may be configured to track outstanding coprocessor load/store operations. A coprocessor load/store operation may be "outstanding" if it has been issued by the CPU processor 12 from the STQ 112 to the coprocessor 10 (including if it is in the CIF 34 awaiting transfer to the coprocessor 10 or in any other pipeline stage of the CPU processor 12 subsequent to issuance from the STQ 112) and has not been completed by the coprocessor 10. A memory operation may be completed by the coprocessor 10 when the data has been transferred between a location in one of the memories 124, 126, and 128 and main memory, although the transfer may be completed via a cache such as the L2 cache 14, another cache between the L2 cache 14 and main memory, or main memory itself.

In an embodiment, the memory ordering table may be configured to track outstanding coprocessor load/store operations based on one or more memory regions that include the address accessed by the coprocessor load/store operations. The memory region may be a contiguous range of memory addresses that encompasses multiple cache lines of the caches in the system. For example, the memory region may be a page of memory, where the page size may be the size of a page translated by a given translation in the address translation mechanism used by the CPU processor 12 (e.g., the translation mechanism implemented in the TLB within the AGU/TLB 118 and related table walking circuitry when a TLB miss occurs). The page size may vary in various embodiments. For example, a 16 kilobyte page may be used. Other embodiments may user larger or smaller page sizes (e.g., 4 kilobytes, 8 kilobytes, 1 Megabyte, 2 Megabytes, etc.). Any page size may be used in an embodiment. In other embodiments, a memory region may be larger than a cache line but smaller than a page, or may be multiple pages. In still other embodiments, a memory region may be a cache line.

For CPU load/store operations, the memory ordering table may be consulted to detect if there are potentially outstanding coprocessor load/store operations to the same address. Since the memory ordering table tracks memory regions, it is possible that a potential ordering issue may be detected if addresses are in the same region by not actually overlapping. However, since ordering issues are expected to be rare between CPU load/store operations and coprocessor load/store operations, the performance impact of over-detecting ordering issues may be relatively small. Additionally, correct ordering in cases in which there is an overlap in the operations is provided.

Coprocessor load/store operations may also be issued from the STQ 112, and may consult the LDQ 114 for potential ordering issues. However, the coprocessor load/store operations need not consult the memory ordering table for ordering, as the coprocessor 10 may be responsible for the ordering among coprocessor load/store operations. On the other hand, the coprocessor load/store operations may update the memory ordering table when issued from the STQ 112, so that the coprocessor load/store operations may be tracked by the memory ordering table.

In one embodiment, the computation operations specified by the instructions implemented in the coprocessor 10 may be performed on vectors of input operands. For example, an embodiment receives vectors of operands from the X memory 124 and the Y memory 126. The compute circuit 130 may include an array of compute elements (circuits) to perform the operations. Each circuit may receive a vector of elements from the X memory 124 and a vector of elements from the Y memory 126, and may evaluate the operation on the vector elements. In an embodiment, the result of the operation may be accumulated with the current value in a corresponding location in the Z memory 128, for write back to the corresponding location in the Z memory 128. In an embodiment, the coprocessor 10 may also support a matrix mode for the compute instructions. In the matrix mode, an outer product of the input vector operands may be computed. In yet another embodiment, vectors of matrices (e.g., 2×2 matrices) may be supported as operands and matrix operations may be performed on the matrices in the vectors.

In an embodiment, the coprocessor 10 may support various data types and data sizes (or precisions). For example, floating point and integer data types may be supported. The floating point data type may include 16 bit, 32 bit, and 64 bit precisions. The integer data types may include 8 bit and 16 bit precisions, and both signed and unsigned integers may be supported. Other embodiments may include a subset of the above precisions, additional precisions, or a subset of the above precisions and additional precisions (e.g., larger or smaller precisions).

In an embodiment, the coprocessor load operations may transfer vectors from a system memory (not shown in FIG. 6) to the X memory 124, Y Memory 126, or Z memory 128. The coprocessor store operations may write the vectors from the X and Y memories 124 and 126 to system memory. The Z memory 128 may be written to memory using an extract instruction to move the results to the X memory 124 and/or the Y memory 126, and then storing the results from the X memory 124 and/or the Y memory 126 to system memory. Alternatively, a store instruction to store the Z memory 128 to main memory may also be supported. The system memory may be a memory accessed at an end of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the coprocessor 10 may be cache coherent with the CPU processor 12. In an embodiment, the coprocessor 10 may have access to the L2 cache 14, and the L2 cache 14 may ensure cache coherency with the data cache 16. In yet another alternative, the coprocessor 10 may have access to the memory system, and a coherence point in the memory system may ensure the coherency of the accesses. In yet another alternative, the coprocessor 10 may have access to the caches 14 and 16. Any mechanism for accessing memory and ensuring coherency may be used in various embodiments.

Similarly, CPU load operations may specify transfer of data from a memory location to the CPU processor 12 (e.g., a register target in the CPU processor 12). CPU store operations may specify the transfer of data from the CPU processor 12 to a memory location. Each load/store operation (whether CPU or coprocessor) may include one or more address operands specified by the corresponding instruction that may be added to produce the effective or virtual memory address of the memory location accessed by the load/store operation. The address operands may include immediate operands, operands stored in a CPU register, etc. The virtual address may then be translated to a physical address through the address translation mechanism, represented by the TLB.

The instruction buffer 122 may be provided to allow the coprocessor 10 to queue instructions while other instructions are being performed. In an embodiment, the instruction buffer 122 may be a first in, first out buffer (FIFO). That is, instructions may be processed in program order. Other embodiments may implement other types of buffers, multiple buffers for different types of instructions (e.g., load/store instructions versus compute instructions) and/or may permit out of order processing of instructions. The instruction buffer 122 may be configured to receive and store instruction bundles. For example, the instruction buffer 122 may have multiple entries, each of which may be configured to store an instruction bundle.

The X memory 124 and the Y memory 126 may each be configured to store at least one vector of input operands. Similarly, the Z memory 128 may be configured to store at least one computation result. The result may be an array of results at the result size (e.g., 16 bit elements or 32 bit elements). In some embodiments, the X memory 124 and the Y memory 126 may be configured to store multiple vectors and/or the Z memory 128 may be configured to store multiple result vectors. Each vector may be stored in a different bank in the memories, and operands for a given instruction may be identified by bank number. More generally, each entry in the memories 124, 126, and 128 may be addressed by a register address (e.g., register number) and thus the entries in the memories may be viewed as registers, similar to an integer or floating point register in the CPU processor 12 (although generally significantly larger than such a register in terms of storage capacity). Viewed in another way, each of the memories 124, 126, and 128 may be addressable as entries using addresses that are referenced to the particular memory (e.g., each memory 124, 126, and 128 may have its own address space). A given address of a given entry in the X memory 124, for example, may have the same numerical value as a second given address of a second given entry in the Y memory 126. Because they are coded in a given instruction as an X memory address or a Y memory address, the correct entry from the correct memory to be read/written may be selected by the coprocessor 10.

The compute circuit 130 may be configured to perform the computation operations, as previously mentioned. The memory access interface 132 may be configured to perform the coprocessor load/store operations. The coprocessor 10 may provide the coprocessor load/store operations from the instruction buffer 122 to the memory access interface 132, which may include a queue for the load/store operations and control logic to select the load/store operations for execution. The address of the coprocessor load/store operations may be provided with the operation from the CPU processor 12, as previously noted. However, for coprocessor store operations, the source data from one of the memories 124, 126, and 128 may not be available until prior compute operations have been completed. Coprocessor load operations may generally be ready for execution when provided to the memory access interface 132, but may have ordering constraints with younger coprocessor load/store operations. The memory access interface 132 may be configured to resolve the ordering constraints and transmit the memory operations to the L2 cache 14.

In an embodiment, the L2 cache 14 may be configured to check for a cache hit for the coprocessor load/store operations, and may also determine if the data (or a portion thereof) accessed by the coprocessor load/store operations is in the DCache 16. The L2 cache 14 may be inclusive of the DCache 16, and thus the tag for the cache line in the L2 cache 14 may indicate if the cache line is in the DCache 16. Alternatively, the L2 cache 14 may include a set of tags for the DCache 16 and may track which cache blocks are in the DCache 16 in the set of tags. If the data is in the DCache 16, the L2 cache 14 may generate an operation to invalidate the DCache 16 cache line (and fetch the data if it is modified). This operation may be referred to as a "back snoop" operation. Additionally, the L2 cache 14 may detect a cache miss for a coprocessor load/store operation, and may fetch the missing cache line from another lower level cache or the main memory to complete the request.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

It is noted that the coprocessor 10 may be illustrated in simplified form, in an embodiment, and may include additional components not shown in FIG. 6. For example, the coprocessor 10 may include a pipeline to decode coprocessor operations, perform register renaming on the operands, use a physical memory size for the X memory 124 and Y memory 126 that is larger than the architected size, and execute computation operations out of order. Any implementation of the coprocessor 10 may be used in various embodiments.

It is noted that, in some embodiments, the coprocessor 10 may be shared by multiple CPU processors 12. The coprocessor 10 may maintain separate contexts in the X memory 124, Y memory 126, and Z memory 128 for each CPU processor 12, for example. Alternatively, contexts may be swapped in the coprocessor 10 when different CPU processors 12 issue coprocessor operations to the coprocessor 10. In an embodiment in which the CPU processor(s) 12 are multithreaded, there may be multiple contexts for a given CPU processor 12.

In one embodiment, the same pipelines from the STQ 112 to the DCache 16/CIF 34 to commit stores may also be used to transmit coprocessor instructions to the CIF 34 for bundling. This leads to several possibilities for the transmission of coprocessor and non-coprocessor operations (e.g., CPU store operations, cache maintenance operations, etc.) to the CIF 34. FIG. 7 is a table 140 illustrating one embodiment of the possibilities and the operation that may be implemented when those possibilities occur. The table include pipe 0 and pipe 1 columns for the two store pipes that may be used in this embodiment, where pipe 0 handles an operation that is older in program order than a concurrently issued operation to pipe 1. In each column, the abbreviation Cop is used for a coprocessor instruction and the abbreviation Non-Cop is used for a non-coprocessor instruction (e.g., CPU store or cache maintenance operation). The bundle status column indicates that status of the bundle in the CIF 34 (open, not open, not applicable). Actions for each pipe are then listed.

Thus, the first row of the table 140 illustrates coprocessor instruction followed by a non-coprocessor operation. The bundle status is not applicable in this case. Pipe 0 may carry the payload for the coprocessor instruction, and the command may be sent on pipe 1 (since a non-coprocessor operation causes the bundle to close). That is, if there is no open bundle, a bundle is opened for the coprocessor instruction and then closed because of the non-coprocessor instruction. The non-coprocessor instruction may be blocked on pipe 0 to permit transmission of the command. In embodiments in which the command is accumulated in the CIF 34, the command may not be explicitly transmitted. Instead, the load/store unit 110 may signal the CIF 34 to close the bundle. There may be additional sideband signals between the load/store unit 110 and the CIF 34 to communicate the context ID and opcodes when payloads are transmitted to the CIF 34, in such embodiments.

The second row of the table 140 illustrates a non-coprocessor operation followed by a coprocessor instruction with no open bundle. In this case, the non-coprocessor operation may be sent on pipe 0 and the payload for the coprocessor instruction may be sent on pipe 1. The payload causes a new bundle to be opened and the payload corresponds to the first coprocessor instruction in the bundle. As illustrated in FIG. 7, the non-coprocessor operation may be sent to either the DCache 16 or the CIF 34. On the other hand, the third row of table 140 illustrates the same set of operations but an open bundle. In this case, both the non-coprocessor operation and the coprocessor instruction may be blocked, and the command may be sent on pipe 0 to close the bundle. In embodiments in which the command is accumulated in the CIF 34, the command may not be explicitly transmitted. Instead, the load/store unit 110 may signal the CIF 34 to close the bundle. In a subsequent clock cycle, the second row of the table 140 may apply.

The fourth and fifth rows of the table 140 illustrate two coprocessor instructions ready to issue on pipes 0 and 1. There are two possibilities in this embodiment, either there is room for two instructions in the bundle or there is room for one instruction. If there is room for two instructions, the fourth row applies. The payloads for the two instructions may be merged and transmitted on pipe 0. That is, the pipes may have a data width that is wide enough to transmit two payloads, and the width may be used in this case to transmit both payloads so that the command may be transmitted on pipe 1 concurrently if the bundle is complete. In embodiments in which the command is accumulated in the CIF 34, the command may not be explicitly transmitted. Instead, the load/store unit 110 may signal the CIF 34 to close the bundle. If the bundle is not complete (there is at least one open slot in the bundle for another coprocessor instruction), the command may not be transmitted and the bundle may remain open. If there is only one open slot in the bundle, the payload for the first coprocessor instruction may be sent on pipe 0 and pipe 1 may be blocked. The command may be merged with the payload on pipe 0 to close the buffer (or the CIF 34 may be signaled to close the bundle, in embodiments in which the CIF 34 generates the command).

The sixth and seventh rows of the table illustrate two non-coprocessor operations to be issued on pipe 0 and pipe 1. If there is no open bundle of coprocessor instructions (sixth row), the two non-coprocessor operations may be sent on pipe 0 and pipe 1. As illustrated in FIG. 7, the non-coprocessor operations may be sent to either the DCache 16 or the CIF 34. If there is an open bundle coprocessor instructions (seventh row), both non-coprocessor ops may be blocked and the command may be transmitted on pipe 0. In embodiments in which the command is accumulated in the CIF 34, the command may not be explicitly transmitted. Instead, the load/store unit 110 may signal the CIF 34 to close the bundle. In a subsequent clock cycle, the sixth row may apply.

In another embodiment, the CPU processor 12 may support two pipes from the STQ 112 to the CIF 34 but the coprocessor 10 may be able to consume more than two coprocessor instructions per clock cycle (e.g., 3 instructions). The CPU processor 12 may support coprocessor instruction fusion in this case, in which one instruction flowing through the CPU processor pipeline represents two coprocessor instructions (and thus has two opcodes and two payloads). As mentioned above, in an embodiment, the data interface between the STQ 114 and the CIF 34 may be wide enough to carry two payloads. The STQ 114 may also include storage for up to two payloads in an entry. Thus, a given issuance from the STQ 114 may be two coprocessor instructions. The instructions may be fused in the early stages of the pipeline of the CPU processor 12, and may effectively become unfused when the payloads are written to different slots in the bundle.

Using fused coprocessor instructions, up to four coprocessor instructions may be issued per clock cycle (e.g., if two fused coprocessor instructions are consecutive in the STQ 114). Thus, a bundle of six or seven coprocessor instructions may be formed in a minimum of 2 clock cycles, if fused ops are prevalent in the instruction stream. For example, two fused instructions may be issued in one clock cycle (4 total instructions) followed by one fused instruction and optionally on non-fused instruction (2 or 3 total instructions) to form a bundle of 6 or 7 coprocessor instructions. That rate of bundle formation may supply an average of 3 instructions per clock cycle.

Instructions may be fused only if they are consecutive in the program order of the instruction stream, in an embodiment. Thus, there may be both fused and unfused coprocessor instructions in the STQ 114. FIG. 8 is a table 142 illustrating one embodiment of the number of coprocessor instructions in the bundle prior to issue (bundle count), fused and unfused coprocessor instructions ready to issue on pipe 0 and pipe 1, respectively (marked as NF for unfused and F for fused in the pipe 0 and pipe 1 columns), whether or not the bundle is closed after issuance of the coprocessor instructions, and whether or not the coprocessor instruction is blocked on pipe 0 or pipe 1. The presence of a zero in the close bundle column for a given row means the bundle remains open, and the presence of a 1 means the bundle is closed. Closing the bundle may imply transmitting the command to the CIF 34 or, in embodiments in which the CIF 34 generates the command, closing the bundle may imply signaling from the load/store unit 110 to the CIF 34 to close the bundle. The presence of a zero in the block 0 or block 1 columns means the corresponding pipe 0 or pipe 1 is not blocked (e.g., the coprocessor instruction is issued). The presence of a one in the block 0 or block 1 column means the corresponding pipe 0 or pipe 1 is blocked (e.g., the coprocessor instruction is not issued). The table of FIG. 7 may still apply for cases of coprocessor and non-coprocessor instructions that are concurrently ready for issue.

In general, the bundle may be closed if, after issue of the instructions for a given row, there are no slots left in the bundle or there is only one slot left in the bundle. If there are no slots left in the bundle, the bundle is full and therefore complete. If there is only one slot left in the bundle, a fused coprocessor instruction would not be able to be issued because it needs two slots for the two fused instructions. Furthermore, waiting an additional clock cycle for one possible instruction may negatively impact the average of three instructions per clock cycle that the bundling is attempting to accomplish.

If the current bundle count is zero or one, there is no restriction on the issuance of fused or non-fused coprocessor instructions since even if two fused coprocessor instructions are issued, there would still be two slots left in the seven slots used in one embodiment. These entries are not listed in the table. Similarly, if the current bundle count is two, any combination of two unfused coprocessor instructions or one fused and one unfused coprocessor instruction may be issued and still leave two open slots. However, if the bundle count is two and two fused coprocessor instructions are issued, the bundle count becomes six (first row of the table 142). In this case, the command still remains to be issued to the CIF 34, so the bundle is not closed yet. In a subsequent clock cycle, the command may be issued and the bundle may be closed. In yet another embodiment, the command may be transmitted concurrent with the payloads and the bundle may be closed. Accordingly, the close bundle column is shown as 0/1 to illustrate the two possibilities. In still another embodiment in which the CIF 34 accumulates the command, the command may not be explicitly transmitted and the bundle may be closed via signaling from the load/store unit 110 to the CIF 34. Alternatively, the bundle may not be closed and the STQ 112 may attempt another issuance with the bundle count equal to six, and the rows of the table 142 with the bundle count of six may apply.

Similarly, if the current bundle count is three and two fused coprocessor instructions are ready to issue, (fourth row of the table 142), the coprocessor instructions may be issued and a subsequent clock cycle may be used to issue the command, in which the last row of the table 142 may apply. Alternatively, as mentioned above, in another embodiment the command may be transmitted concurrent with the payloads and the bundle may be closed. In embodiments in which the CIF 34 generates the bundle, there may be no transmission of the command and the load/store unit 110 may signal the CIF 34 to close the bundle. Accordingly, the close bundle column is shown as 0/1 to illustrate the two possibilities. Other scenarios with three instructions in the current bundle count (second and third rows of the table 142) may cause the bundle to close with a total of six coprocessor instructions. The command may be transmitted with the unfused instruction (pipe 0 for the second row, pipe 1 for the third row).

If the current bundle count is 4, any combination that results in two or more coprocessor instructions being transmitted causes the bundle to close. The command may be sent on pipe 1 in each case except the second case of bundle count of 4 (sixth row of the table 142), in which case it is sent with the unfused instruction on pipe 0. The combination of two fused coprocessor instructions causes a block on pipe 1 because the second of the fused instructions may not fit in the bundle. The command is issued on pipe 1 instead in this case. In embodiments in which the CIF 34 generates the command, the command may not be sent explicitly and instead the load/store unit 110 may signal the CIF 34 to close the bundle.

With a current bundle count of 5, any combination of one or more coprocessor instructions completes the bundle. Combinations of three total coprocessor instructions cause pipe 1 to be blocked. In each case, the command may be issued on pipe 1 (along with a non-fused coprocessor instruction or no coprocessor instruction in the tenth, eleventh, and thirteenth rows of the table 142 or instead of the instruction in the twelfth, fourteenth, and fifteenth rows of the table 142). In embodiments in which the CIF 34 generates the command, the command may not be sent explicitly and instead the load/store unit 110 may signal the CIF 34 to close the bundle.

With a current bundle count of 6, only one non-fused coprocessor may be transmitted on pipe 0 (sixteenth to eighteenth rows of table 142). The command is issued on pipe 1 with either no coprocessor instruction (sixteenth row) or in place of the blocked coprocessor instruction (seventeenth and eighteenth rows). The nineteenth row represents a case where both pipes are blocked and the command is sent on pipe 0. In embodiments in which the CIF 34 generates the command, the command may not be sent explicitly and instead the load/store unit 110 may signal the CIF 34 to close the bundle.

The last row of the table 142 illustrates a case in which the bundle is full (current bundle count of 7). Both pipes are blocked and the command may be transmitted on pipe 0 in this case. In embodiments in which the CIF 34 generates the command, the command may not be sent explicitly and instead the load/store unit 110 may signal the CIF 34 to close the bundle.

Figure 9:
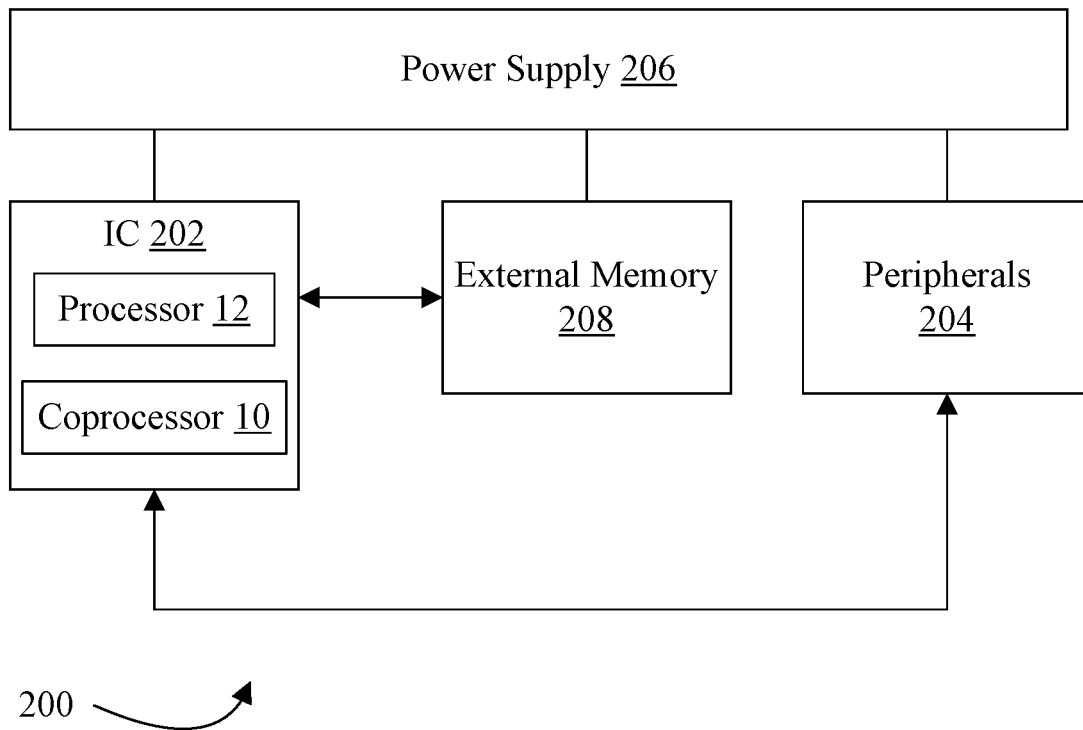
FIG. 9 is a block diagram of one embodiment of a system including the processor and the coprocessor.

FIG. 9 is a block diagram of one embodiment of a system 200. In the illustrated embodiment, the system 200 includes at least one instance of an integrated circuit (IC) 202 coupled to one or more peripherals 204 and an external memory 208. A power supply 206 is provided which supplies the supply voltages to the IC 202 as well as one or more supply voltages to the memory 208 and/or the peripherals 204. The IC 202 may include one or more instances of the CPU processor 12 and one or more instances of the coprocessor 10. In other embodiments, multiple ICs may be provided with instances of the CPU processor 12 and/or the coprocessor 10 on them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device capable of benefitting from the coprocessor 10 (e.g., neural networks, LSTM networks, other machine learning engines including devices that implement machine learning, etc.). In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g., desktop personal computer, laptop, workstation, net top etc.).

The external memory 208 may include any type of memory. For example, the external memory 208 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 208 may include one or more memory modules to which the memory devices are mounted, such as single inline memory modules (SIMMs), dual inline memory modules (DIMMs), etc. Alternatively, the external memory 208 may include one or more memory devices that are mounted on the IC 202 in a chip-on-chip or package-on-package implementation.

Figure 10:
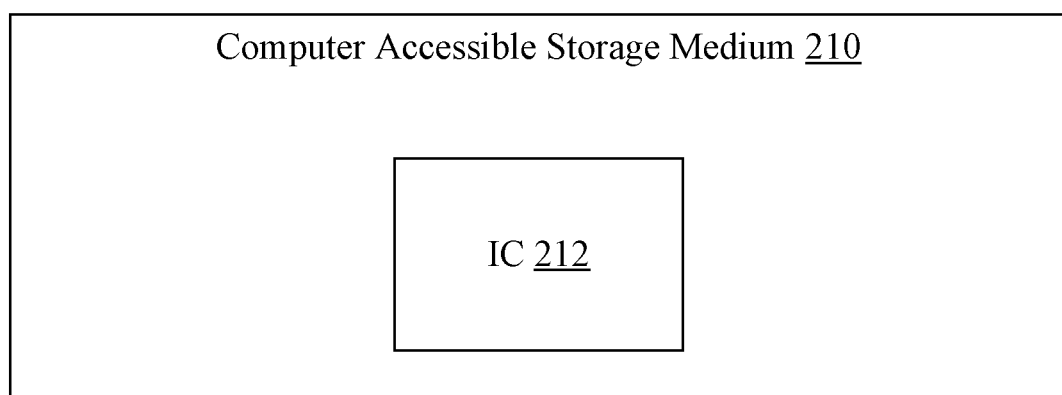
FIG. 10 is a block diagram of one embodiment of a computer accessible storage medium.

FIG. 10 is a block diagram of one embodiment of a computer accessible storage medium 210 is shown storing an electronic description of the IC 202 (reference numeral 212). More particularly, the description may include at least the coprocessor 10 and/or the CPU processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 210 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 212 of the IC 202 stored on the computer accessible storage medium 210 may be a database which can be read by a program and used, directly or indirectly, to fabricate the hardware comprising the IC 202. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 202. The netlist may then be placed and routed to produce a data set describing geometric shapes to be applied to masks. The masks may then be used in various semiconductor fabrication steps to produce a semiconductor circuit or circuits corresponding to the IC 202. Alternatively, the description 212 on the computer accessible storage medium 210 may be the netlist (with or without the synthesis library) or the data set, as desired.

While the computer accessible storage medium 210 stores a description 212 of the IC 202, other embodiments may store a description 212 of any portion of the IC 202, as desired (e.g., the coprocessor 10 and/or the CPU processor 12, as mentioned above).

Numerous variations and modifications will become apparent to those skilled in the art once the above disclosure is fully appreciated. It is intended that the following claims be interpreted to embrace all such variations and modifications.

What is claimed is:

1. A processor comprising:
a coprocessor issue circuit comprising a queue circuit, wherein the processor is configured to store coprocessor instructions for a coprocessor to which the processor is coupled in the queue circuit; and
an interface unit coupled to the coprocessor issue circuit, the interface unit comprising a buffer including a plurality of entries; wherein:
the coprocessor issue circuit is configured to issue one or more first coprocessor instructions from the queue circuit to the interface unit and to subsequently issue one or more second coprocessor instructions from the queue circuit to the interface unit;
the interface unit is configured to allocate a first entry of the plurality of entries based on issuance of the one or more first coprocessor instructions, and to write first data corresponding to the one or more first coprocessor instructions to the first entry;
the interface unit is configured to merge second data corresponding to the one or more second coprocessor instructions in the first entry based on issuance of the one or more second coprocessor instructions;
the interface unit is configured to close the first entry and to write a command to the first entry;
the command comprises a plurality of opcodes corresponding to respective ones of the one or more first coprocessor instructions and the one or more second coprocessor instructions;
the first data comprises source data from processor registers specified by the one or more first coprocessor instructions and the second data comprises source data from processor registers specified by the one or more second coprocessor instructions; and
the source data further specifies the first coprocessor instructions and the second coprocessor instructions identified by the plurality of opcodes.

2. The processor as recited in claim 1 wherein the command further comprises a valid field identifying which of a plurality of opcode fields in the command have valid opcodes corresponding to the one or more first coprocessor instructions and the one or more second coprocessor instructions.

3. The processor as recited in claim 1 wherein:
the coprocessor issue circuit is configured to generate the command; and
the coprocessor issue circuit is configured to transmit the command to the interface unit to close the first entry.

4. The processor as recited in claim 1 wherein:
the interface unit is configured to generate the command; and
the coprocessor issue circuit is configured to transmit an indication to the interface unit to close the first entry.

5. The processor as recited in claim 1 wherein the coprocessor issue circuit is configured to initialize a timer responsive to the coprocessor issue circuit issuing the one or more first coprocessor instructions, and wherein the coprocessor issue circuit is configured to close the first entry responsive to expiration of the timer.

6. The processor as recited in claim 1 wherein the coprocessor issue circuit is configured to close the first entry responsive to detecting a processor store operation.

7. The processor as recited in claim 1 wherein the coprocessor issue circuit is configured to close the first entry responsive to detecting a barrier operation.

8. The processor as recited in claim 1 wherein the coprocessor issue circuit is configured to close the first entry responsive to determining that the first entry is complete.

9. The processor as recited in claim 1 wherein the source data identifies one or more operands within the coprocessor on which the one or more first coprocessor instructions and the one or more second coprocessor instructions operate during execution by the coprocessor.

10. The processor as recited in claim 1 wherein a given opcode of the plurality of opcodes identifies a group of coprocessor instructions, and wherein the source data selects one of the group of coprocessor instructions to be executed by the coprocessor.

11. The processor as recited in claim 1 wherein the coprocessor issue circuit is configured to issue one or more coprocessor load/store instructions to the interface unit, and wherein the interface unit is configured to write third data corresponding to the one or more coprocessor load/store instructions to one of the plurality of entries, wherein the third data comprises respective addresses of memory locations accessed by the one or more coprocessor load/store instructions when executed by the coprocessor.

12. The processor as recited in claim 11 wherein the third data further comprises respective completion identifiers for respective coprocessor load/store instructions, wherein the respective completion identifiers identify the respective coprocessor load/store instructions to the processor when returned by the coprocessor based on completion of the respective coprocessor load/store instructions by the coprocessor.

13. The processor as recited in claim 11 wherein the respective addresses are physical addresses and the processor is configured to translate respective virtual addresses corresponding to the one or more coprocessor load/store instructions to generate the respective addresses.

14. A method comprising:
accumulating data describing coprocessor instructions in a buffer entry of a buffer in an interface unit of a processor over a plurality of clock cycles, wherein the accumulating includes merging data from first coprocessor instructions and second coprocessor instructions, the data including respective source data specified by one or more of the first coprocessor instructions and one or more of the second coprocessor instructions;
writing a command to the buffer entry, the command comprising opcodes corresponding to respective ones of the first and second coprocessor instructions;
closing the buffer entry and transmitting the accumulated data to a coprocessor by the interface unit; and
executing the coprocessor instructions in the coprocessor, wherein the coprocessor is capable of executing the coprocessor instructions at up to a first rate, and wherein an average rate at which the interface unit is capable of providing coprocessor instructions matches the first rate.

15. The method as recited in claim 14 wherein the data in the buffer entry comprises source data read from source registers in the processor, wherein the source registers are specified by the coprocessor instructions.

16. The method as recited in claim 15 wherein the data further comprise a command field that includes a plurality of opcodes corresponding to the coprocessor instructions, and wherein a given opcode of the plurality of opcodes identifies a group of coprocessor instructions, and wherein the source data selects one of the group of coprocessor instructions to be executed by the coprocessor.

17. The method as recited in claim 14 wherein the data in the buffer entry further comprises a physical address to be accessed by a coprocessor load/store instruction within the coprocessor instructions, the method further comprising:
translating a virtual address formed by the processor for the coprocessor to the physical address.

18. A system comprising:
a processor; and
a coprocessor coupled to the processor, wherein:
the processor includes an interface having a buffer configured to accumulate a bundle corresponding to a plurality of coprocessor instructions to transmit to the coprocessor for execution, the bundle comprising data, merged into an entry of the buffer, from ones of the plurality of coprocessor instructions,
the bundle comprises a command field that specifies a plurality of opcodes corresponding to the plurality of coprocessor instructions and a plurality of data fields corresponding to the plurality of coprocessor instructions,
the plurality of data fields comprises source data from processor registers specified by the plurality of coprocessor instructions, and
the source data further specifies the plurality of coprocessor instructions identified by the plurality of opcodes.

19. The system as recited in claim 18 wherein a given opcode of the plurality of opcodes identifies a group of coprocessor instructions, and wherein the source data selects one of the group of coprocessor instructions to be executed by the coprocessor.

20. The system as recited in claim 18 wherein a given instruction of the plurality of coprocessor instructions is a coprocessor load/store instruction, and a given data field in the bundle corresponding to the given instruction specifies an address of a memory location accessed by the coprocessor load/store instruction when executed by the coprocessor.

* * * * *